United States Patent [19]

Rupel et al.

[11] Patent Number: 4,967,378

[45] Date of Patent: Oct. 30, 1990

[54] METHOD AND SYSTEM FOR DISPLAYING A MONOCHROME BITMAP ON A COLOR DISPLAY

[75] Inventors: Wesley O. Rupel, Bellevue; Anthony C. Pisculli, Seattle, both of Wash.

[73] Assignee: Microsoft Corporation, Redmond, Wash.

[21] Appl. No.: 244,450

[22] Filed: Sep. 13, 1988

[51] Int. Cl.⁵ .......................... G09G 1/16; G06F 3/14

[52] U.S. Cl. .................................... 364/518; 364/521; 340/703; 340/799; 340/798; 340/803

[58] Field of Search ....................... 364/521, 523, 518; 340/750, 703, 747, 744, 799, 798, 801, 803

[56] References Cited

U.S. PATENT DOCUMENTS

| | | | |
|---|---|---|---|
| 4,149,152 | 4/1979 | Russo | 340/703 |
| 4,217,577 | 8/1980 | Roe et al. | 340/703 |
| 4,467,322 | 8/1984 | Bell et al. | 340/701 |
| 4,616,220 | 10/1986 | Grunewald et al. | 340/747 |
| 4,706,079 | 11/1987 | Kummer et al. | 340/799 |
| 4,752,893 | 6/1988 | Guttag et al. | 364/518 |

*Primary Examiner*—Gary V. Harkcom
*Assistant Examiner*—Raymond J. Bayerl
*Attorney, Agent, or Firm*—Seed and Berry

[57] ABSTRACT

A method and system of displaying a monochrome bitmap on a color display. In a preferred embodiment, a system according to the present invention accomplishes the display of the monochrome bitmap in any two preselected colors. The multibit representations for the two preselected display colors are compared to identify bitmap planes having common bit values for each color. The input for logic units for the identified planes are then forced to 0. The latch registers for each plane of the bitmap memory are then set to the bit value for the first preselected color in that plane. The input values from the monochrome bitmap, as altered by the force-to-0 operation for common planes, are logically exclusively ORed with the latch register values to produce the bitmap memory values for displays. An alternate embodiment suitable for updating partial bytes within the bitmaps is also provided.

17 Claims, 8 Drawing Sheets

FIG. 4
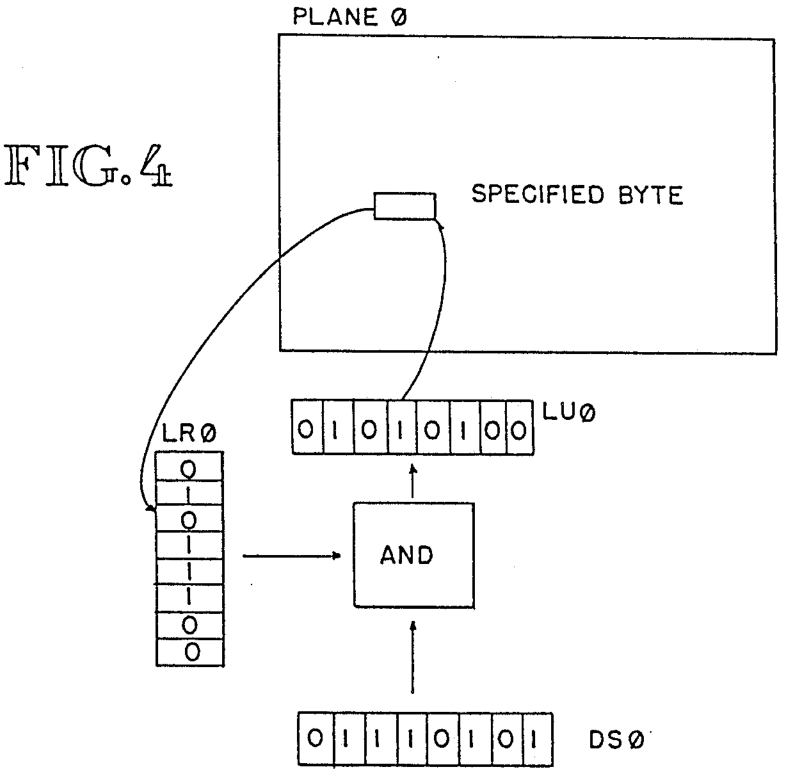
FIG. 5
| | | | | | | | | |
|---|---|---|---|---|---|---|---|---|
| LRØ | 1 | 1 | 1 | 1 | 1 | 1 | 1 | 1 |
| LR1 | 1 | 1 | 1 | 1 | 1 | 1 | 1 | 1 |
| LR2 | 0 | 0 | 0 | 0 | 0 | 0 | 0 | 0 |
| LR3 | 0 | 0 | 0 | 0 | 0 | 0 | 0 | 0 |
FIG. 6
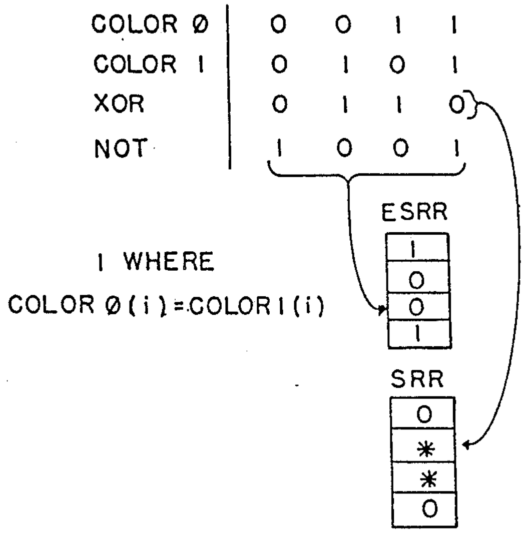

FIG. 8

| | |
|---|---|
| INPUT BYTE | 0 1 0 1 1 0 0 1 |
| DSØ | 0 0 0 0 0 0 0 0 |
| DS1 | 0 1 0 1 1 0 0 1 |
| DS2 | 0 1 0 1 1 0 0 1 |
| DS3 | 0 0 0 0 0 0 0 0 |
| LATCH Ø | 1 1 1 1 1 1 1 1 |
| LATCH 1 | 1 1 1 1 1 1 1 1 |
| LATCH 2 | 0 0 0 0 0 0 0 0 |
| LATCH 3 | 0 0 0 0 0 0 0 0 |

| | | |
|---|---|---|
| LATCH Ø XOR DSØ | 1 1 1 1 1 1 1 1 | LUØ |
| LATCH 1 XOR DS1 | 1 0 1 0 0 1 1 0 | LU 1 |
| LATCH 2 XOR DS2 | 0 1 0 1 1 0 0 1 | LU 2 |
| LATCH 3 XOR DS3 | 0 0 0 0 0 0 0 0 | LU 3 |

PIXELS CORRESPONDING TO BITS 0,3,4, AND 6 SET TO COLOR Ø
PIXELS CORRESPONDING TO BITS 1,2,5 AND 7 SET TO COLOR 1

METHOD AND SYSTEM FOR DISPLAYING A MONOCHROME BITMAP ON A COLOR DISPLAY

TECHNICAL FIELD

This invention relates generally to a computer system for displaying information on a color display, and more specifically a method and apparatus for updating the bitmap memory of a graphics adapter.

BACKGROUND ART

The output devices of a personal computer often include a graphics adapter and a monochrome display. The graphics adapter (GA) contains a bitmap memory that is accessible by the computer's central processing unit (CPU) and the GA's CPU. Each bit in the bitmap memory corresponds to one pixel on the display screen. To display data, the GA CPU reads the bitmap memory. If a bit is 1 then the GA turns the corresponding pixel on. If a bit is 0 then the GA turns the corresponding pixel off. By changing the contents of the bitmap memory, a computer program can effect a change on the display screen.

To accommodate color displays the GA needs to be more sophisticated. A single bit in bitmap memory per screen pixel is not sufficient to represent more than two colors. If four colors are to be displayed, then two bits per pixel are needed; if eight colors are to be displayed, then three bits per pixel are needed; if sixteen colors are to be displayed, then four bits per pixel are needed; and so on. Each bit per pixel is conceptually considered to be in a separate plane, with a one bit per pixel bitmap maintained for each plane. FIG. 1 illustrates a bitmap with four planes. The GA CPU will read the 4 bits for each pixel from each of the four planes and turn the appropriate color on for that pixel on the screen.

The GA bitmap memory is typically an 8-bit byte (a byte is a sequence of adjacent binary digits operated upon as a unit in a computer) that is, eight bits can be written to the bitmap memory at a time. To fill an entire bitmap memory in a conventional computer system, the computer CPU would generally for each plane write each byte. Thus, the total number of byte output to the GA is the number of planes times the number of bytes per scan line times the number of scan line.

DISCLOSURE OF THE INVENTION

It is an object of the present invention to provide a method and system for efficiently displaying a monochrome bitmap on a color display.

It is another object of the present invention to provide such a method and system that will minimize the number of CPU to GA write operations required to write a monochrome bitmap to a color bitmap memory.

It is another object of the present invention to provide such a method and system that can efficiently display a monochrome bitmap to portions of a color bitmap memory that are not byte aligned with the monochrome bitmap.

These and other objects, which will become apparent as the invention is more fully described below, are obtained by an improved method and system for updating a multiplane bitmap memory. In preferred embodiments, logical operations are used to generate the color bitmap memory enabling a monochrome bitmap to be written efficiently to a color bitmap memory. The invention updates the bitmap memory with a number of writes that is independent of the number of planes in the bitmap memory. The number of writes is on the order of the number of bytes per scan line times the number of scan lines per plane.

In preferred embodiments, the registers and logical units of the GA are initialized to permit efficient updating of the bitmap memory. First, the multibit representations for the two preselected display colors are compared to identify bitmap planes having common bit values for each color. The input for logic units for the identified planes are then forced to 0. The latch registers for each plane of the bitmap memory are then set to the bit value for the first preselected color in that plane. The input values from the monochrome bitmap, as altered by the force-to-0 operation for common planes, are logically exclusively ORed with the latch register values to produce the bitmap memory values for displays.

One preferred embodiment includes an alternate method of update of the bitmap memory to allow efficient updating of edge portions of a display for which the single plane monochrome bitmap and multiplane color display are not byte aligned.

BRIEF DESCRIPTION OF THE DRAWINGS

FIG. 4 illustrates a typical use of the LUs.

FIG. 5 illustrates the contents of the LRs with color0.

FIG. 6 illustrates a sample setting for the ESRR and the SRR.

FIG. 8 illustrates sample contents of the GA components.

DETAILED DESCRIPTION OF THE INVENTION

A preferred embodiment of the present invention is described below as implemented on an IBM PC or compatible computer, including graphics adapter (GA). To facilitate an understanding of this embodiment, the following section describes the operation of a GA on a typical computer system. GRAPHICS ADAPTER A typical color graphics adapter (GA) displays information in color based on four planes (Plane0–Plane3) of a bitmap memory. Thus, one of sixteen colors can be displayed at each screen pixel. The GA provides several functions that allow the GA to process a byte of information that has been sent to it by the computer CPU. While the GA is processing such a byte, the computer CPU is free to execute its own instructions. This is in effect parallel processing. The GA performs several complex graphics functions that can significantly increase the speed of processing graphics information.

Figure 2:
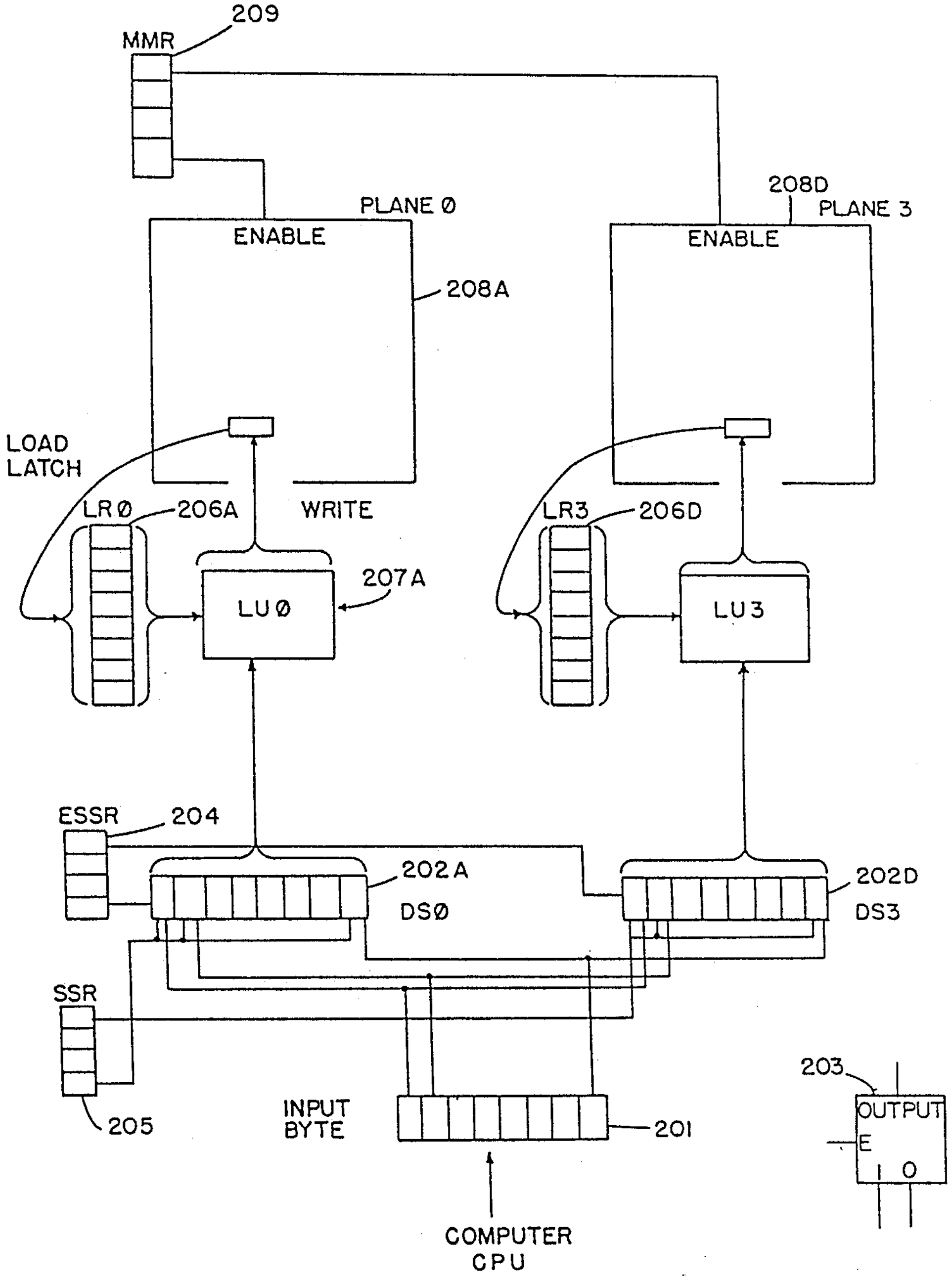
FIG. 2 is a schematic of a graphics adapter.

FIG. 2 is a schematic of a typical GA. (Typical GAs include IBM's Color Graphics Adapter and Enhanced Graphics Adapter). Only one byte (201) of information is transferred from the computer CPU to the GA at a time. The GA contains four banks of eight data selectors (DS0–DS3) (202A–202D), corresponding to one bank for each plane. Bit 0 of DS0 is referred to DS0[0];

bit 1 of DS0 is referred to as DS0[1]; and so on. A data selector (203) is a logical element with three inputs and one output. If a logical one is applied to the enable input (E) then the DS selects the 1-input to output. If a logical zero is applied to the enable input the DS selects the 0-input to output.

The GA contains a Set/Reset Register (SRR) (205) and an Enable Set/Reset Register (ESRR) (204). Both registers are 4 bits wide. Each bit corresponds to one of the four planes. These registers are loaded from the computer CPU.

The SRR, the ESRR, and the input byte are inputs for the DSs. The ESRR is logically connected to the enable inputs of the DSs. Bit 0 of the ESRR is logically connected to each enable input of DS0. (202A); bit 1 of the ESRR is logically connected to each enable input of DS1 (202B); and so on for DS2 and DS3. The SRR is logically connected of the 1-inputs of the DSs. Bit 0 of the SRR is logically connected to each 1-input of DS0 (202A); bit 1 of the SRR is logically connected to each 1-input of DS1 (202B); and so on for DS2 and DS3. The input byte (201) is logically connected to the 0-input of each DS. Bit 0 of the input byte is logically connected to the 0-input of DS0[0], DS1[0], DS2[0], and DS3[0]; bit 1 of the input byte is logically connected to the 0-input of DS1[1], DS1[1], DS2[1], and DS3[1]; and so on for the other six bits of DS0–DS4.

The GA contains four eight-bit latch registers (LR0–LR3) (206A–206D). Each latch register corresponds to one of the four planes. The computer CPU can instruct the GA to load the LRs registers with one byte of data from a location in the corresponding plane of the bitmap memory.

The GA contains four logical units (LU0–LU3) (207A–207D). Each logical unit corresponds to one of the four planes. The LUs perform logical operations (e.g., AND, OR, XOR, and data selection) on the outputs from the DSs and the LRs. The computer CPU can select the logical operation to perform.

The GA contains four display memory planes (Plane0–Plane3) (208A–208D). The GA writes the output of the LUs to a specified location in the corresponding plane that has its enable input set to 1. The GA contains an 4-bit Memory Mask Register (MMR) (209). Each bit corresponds to a plane. The MMR is logically connected to the enable input of the planes. Bit 0 of the MMR (MMR[0]) is logically connected to the enable input of Plane0; bit 1 of the MMR (MMR[1]) is logically connected to the enable input of Plane1; and so on the other two planes.

Figure 1:
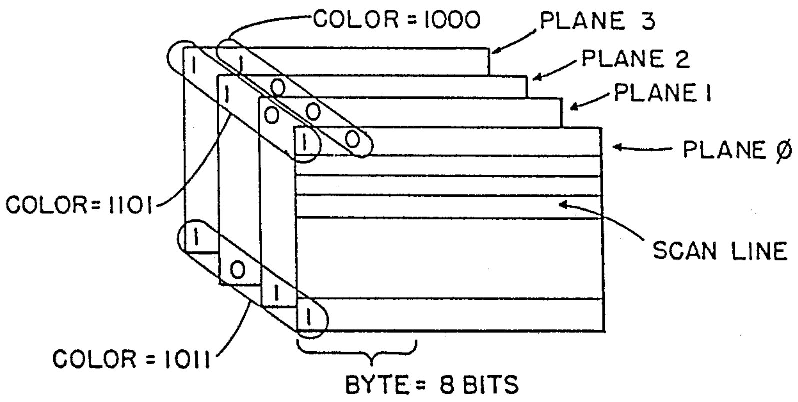
FIG. 1 illustrates a bitmap memory with four planes.
Figure 3:
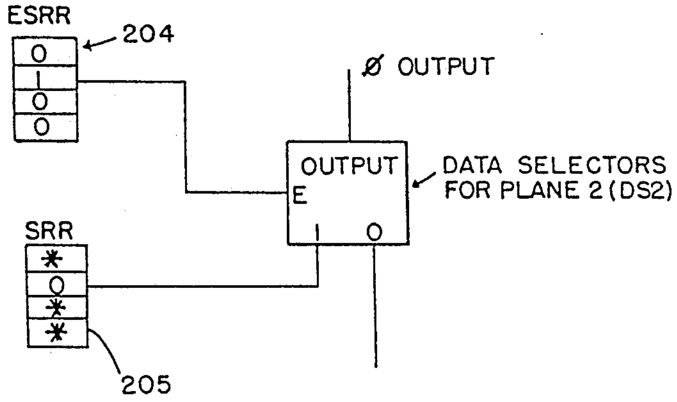
FIG. 3 illustrates the ESRR and SRR.

In operation, the SRR and the ESRR are used to force the output of each bit in a DS to a 0 or 1. FIG. 3 illustrates the ESRR loaded ("0100") to select Plane2 and the SRR loaded ("*0") to force the output of each bit of DS2 to a 0. The asterisks (205**) indicate that the contents does not matter (i.e., don't care) because the corresponding DS select the data from the input byte and not from the SRR.

In operation, the LRs and LUs are used to update the current content of bitmap memory byte. Typically, the computer CPU directs the GA to select a logical operation and to load the LRs from a specified bitmap memory byte. The computer CPU then sends an input byte to the GA. The GA performs the logical operation on the output of the LRs and the DSs. The GA updates the specified bitmap memory byte. FIG. 4 illustrates the performing of a logical AND operation. The computer CPU directs the LUs to perform the AND function. The computer CPU then directs the loading of the LRs from a specified byte in the bitmap memory. The LR0 of FIG. 4 has been loaded with "01011100" from the bitmap memory. The computer CPU the directs the loading of the input byte, which is illustrated as a "01110101", which depending upon the ESRR and SRR contents, is output on DS0. The GA updates the specified byte with the output of LU0, which is the logical AND of LR0 and DS0 ("01010100"). All four planes can be updated depending on the contents of the MMR.

MONOCHROME TO COLOR

The system outputs a monochrome bitmap (one plane) to the GA. The system uses the monochrome bitmap, the origin where to display the monochrome bitmap in the bitmap memory, and two colors. One color (color1) corresponds to the 1 bits and the other color (color0) to the 0 bits of the monochrome bitmap. With a four plane bitmap memory, the colors are specified by four bits each. The system writes to the bitmap memory of the GA updating all four planes to effect the display of the monochrome bitmap at the specified origin in the specified colors.

Initially, the system loads the LRs with color0. Since the LRs are loaded from the bitmap memory, the computer CPU first fills a byte of the bitmap memory with the color0. The computer CPU updates each of the four planes to fill the byte with color0. The computer CPU then directs the GA to load the LRs from the byte filled with the color0. In a preferred embodiment, the GA has a portion of its bitmap memory that is not visible on the screen. The color0 byte could be written to such a non-visible portion so that the color0 byte will not affect the visible display. Alternatively, the color0 byte can be written to the area of the bitmap memory where the monochrome bitmap is to be written (i.e., at the origin). Although that color0 byte will be visible, it will be reset to the appropriate colors when the monochrome bitmap overlays it. Also, this technique may be used if the particular GA has no non-visible portions. FIG. 5 illustrates the contents of the LRs loaded with the color0 ("0011").

The system then loads the SRR with 0s in each bit where the corresponding bits of color0 and color1 are the same. FIG. 6 illustrates the loading of the SRR when color0 is "0011" and color1 is "0101". Bits 0 of color0 and color1 are both 1 so bit 0 of the SRR is set to a 0. Bits 3 of color0 and color1 are both 0 so bit 3 of the SRR is set to a 0. The asterisk in the SRR indicates the contents of bits 1 and 2 of the SRR can be either a "0" or "1", that is, "don't care" bits. The system can calculate the value to load into the SRR by performing an XOR with color0 and color1 as illustrated in FIG. 6. Alternatively, the system could simply load the SRR with all 0 s, bits 1 and 2 are "don't care" bits.

The system loads the ESRR with 1 in each bit where the corresponding bits of color0 and color1 are the same and with a 0 in each bit where the corresponding bits of color0 and color1 are different. FIG. 6 illustrates the loading of the ESRR. Bits 0 of color0 and color1 are both a 1 so bit 0 of the ESRR is set to a 1. Bits 3 of color0 and color1 are both a 0 so bit 3 of the ESRR is set to a 1. Bits 1 and 2 of the ESRR are set to a 0 because the corresponding bits in color0 and color1 are different. The system can calculate the value to load into the ESRR by taking the XOR of color0 and color1 and taking the logical-NOT of that result (NOT(color0 XOR color1)).

The system directs the LU to execute the XOR function and enables all the planes by writing a "1111" to the MMR.

The system writes each byte of the monochrome bitmap to the bitmap memory based on the specified origin.

Figure 7:
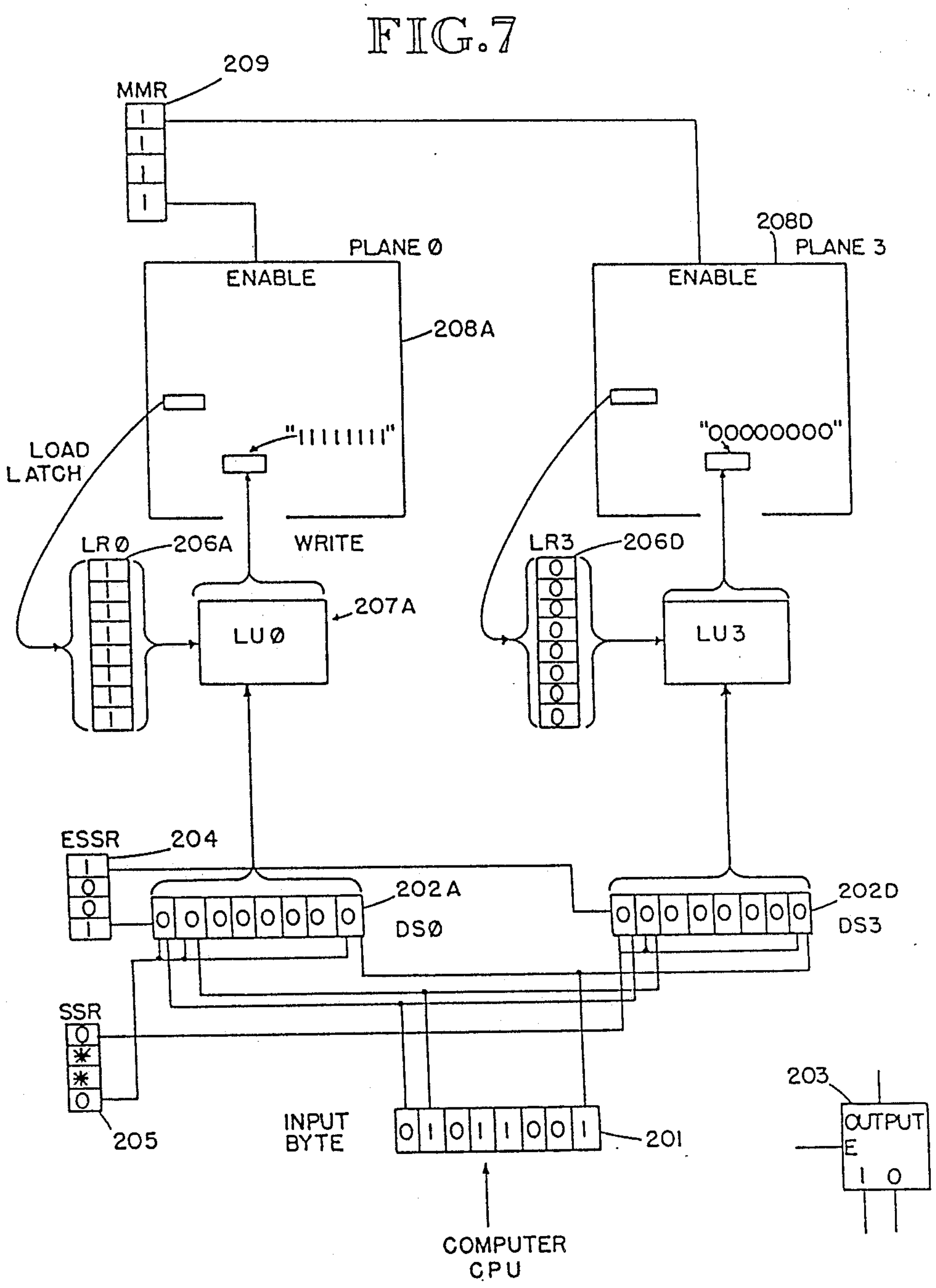
FIG. 7 is a schematic of a GA with sample data.

With the LRs, the SRR, the ESRR, and the LUs initialized as described above (FIG. 7), the GA updates all four planes with the correct color (color0 or color1) when each byte is written to the GA. FIG. 8 illustrates the outputs of the DSs and the LUs for the sample input byte "01011001". The DS0 and DS3 output all 0s because the ESRR was set to enable the SRR for those planes. The DS1 and DS2 pass the input byte through. The output of LU0, which is the XOR of LR0 and DS0, is all 1s. This reflects the instance where bits 0 of color0 and color1 are both 1, thus plane0 is set to all 1s for this byte. Similarly, the output of LU3, which is the XOR of LR3 and DS3, is all 0s. This reflects the instance where bits 3 of color0 and color1 are both 0, thus plane 3 is set to all 0s for this byte.

Plane 1 and plane 2, in this example, are the planes in which the corresponding bits for color0 and color1 are different. The DS1 and DS2 outputs are equal to the input byte. LR1 was initialized to contain bit 1 of color0, that is, a 1. The effect of the XOR function is that if a bit from the input byte is 0 then LU1 for that bit is a 1 else LU1 for that bit is a 0. Similarly, LR2 was initialized to contain bit 2 of color0, that is, a 0. The effect of the XOR function is that if a bit from the input byte is 0 then LU2 for that bit is a 0 else LU2 for that bit is a 1.

As illustrated in FIG. 8, the outputs of LU0 through LU3 contain the color settings for Plane 0 through Plane 3 to effect the conversion of the input byte to color0 and color1.

The writing of the monochrome bitmap to the bitmap memory of the GA is especially efficient when the computer CPU executes a repeat instruction. For example, the Intel 80386 has a repeat instruction. In the preferred embodiment, with the appropriate setup in the registers, the "rep movsw" and the "rep movsb" or the "rep stosb" instructions can be used to update the bitmap memory.

Although this preferred embodiment uses the logical-XOR function, other logical functions, such as the logical-NOT-XOR, with appropriate settings of the registers are satisfactory.

EDGE MONOCHROME TO COLOR

Figure 11:
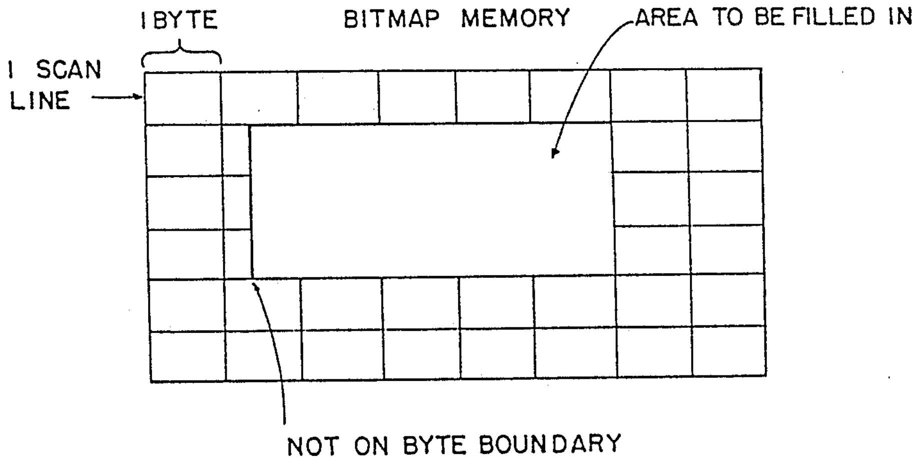
FIG. 11 illustrates an area of a display bitmap that is not on a byte boundary.

FIG. 11 illustrates the situation when the area of bitmap memory in which the monochrome bitmap is to be written is not byte aligned. Only part of the bytes on the left-most column of the area are to be updated. The left-most bits of that byte are to remain unchanged. The Monochrome to color system described above necessarily updates each bit in every byte that is written to. Thus, it may not be optimum for updating partial bytes. An alternate preferred embodiment of the present invention provides a means for partial byte updates from a monochrome bitmap to bitmap memory. The methods and systems utilized in this alternate preferred embodiment could also be used to update the entire bitmap memory with improved results over conventional display techniques.

The system updates the partial bytes by writing to each partial byte preferably at most twice. The system loads the SRR with the color0, the ESRR with the logical-NOT of the logical-XOR of color0 and color1, and the MMR with the logical-OR of color1 and the value just store in the ESRR.

Figure 9:
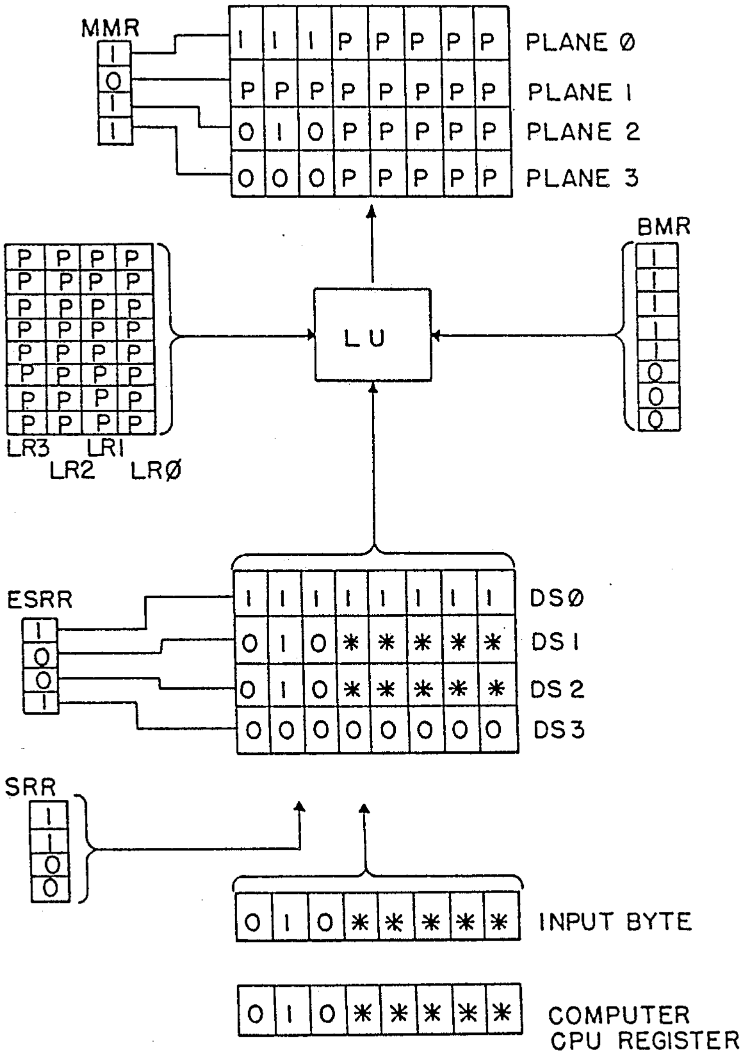
FIG. 9 illustrates the state of a GA after the first EDGE MONOCHROME TO COLOR pass.

FIG. 9 illustrates these registers loaded based on a color0 of "0011" and a color1 of "0101". The SRR contains "0011". The logical-XOR of color0 and color1 is "0110" and the logical-NOT of that is "1001". The ESRR contains "1001". The MMR contains the logical-OR of "0101" and "1001" is "1101".

The GA contains an 8-bit Bit Mask Register (BMR) as illustrated in FIG. 9, with each bit corresponding to a bit in the LRs and the DSs. The BMR allows the GA to select bit-by-bit either the LR or the DS to output from the LU. If BMR contains a 1, then the LR is selected; if the BMR contains a 0, then the DS is selected. (Note: On the IBM EGA, a 1 selects the DS.)

This system sets the BMR to 1s for those bits of the partial bytes that are not to be updated and to 0s for those bits that are to be updated based on the monochrome bitmap. In FIG. 9, the BMR is loaded with "00011111", which indicates that bits 0 through 4 are not to be updated and bits 5 through 7 are to be updates.

The system then loads a computer CPU register with the contents of the partial byte from the monochrome bitmap. FIG. 9 illustrates such a register loaded with "010*****", the asterisks indicating don't cares because those bits will not be selected by the BMR.

The system preferably executes an exchange instruction, such as the "xchg" of the Intel 80386, to exchange the contents of the computer CPU register with the target byte in the bitmap memory. The exchange instruction causes the LRs to be loaded with the contents of the target byte from the bitmap display. The Ps in FIG. 9 indicate that the previous contents of the target byte is loaded. The exchange instruction then outputs the contents of the computer CPU register to the GA as the input byte.

With the ESRR and the SRR initialized as described above, the output of the DSs is shown in FIG. 9. DS1 and DS2 have the input byte as its output.

With the BMR initialized, the output of the LU is the previous contents of the target byte for bits 0 through bit 4 because the LRs are selected. Bits 5 through bits 7 contain the outputs from the DSs.

Since Plane0, Plane2 and Plane3 are enabled (MMR="1101"), the target byte is loaded as shown in FIG. 9. The Ps indicate the bits have not changed. Since Plane1 was not enabled none of the bits change. The bits that did change, however, have the correct color setting, except for plane 2.

Figure 10:
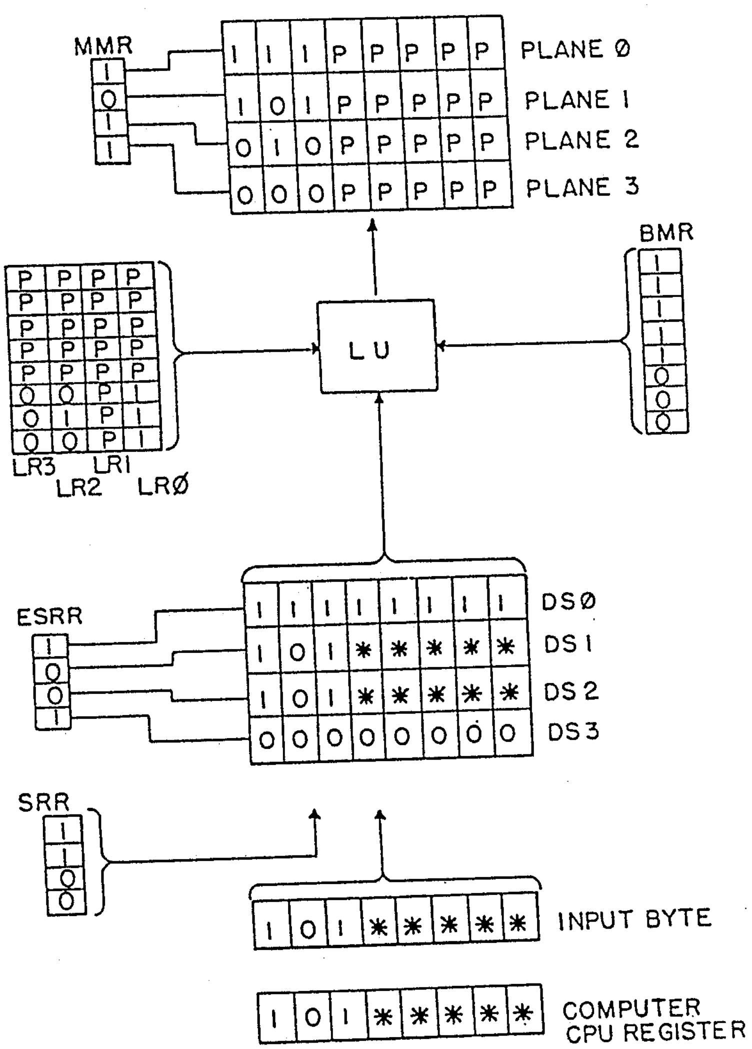
FIG. 10 illustrate the state of a GA after the second EDGE MONOCHROME TO COLOR pass.

The system now changes the remaining planes to the correct setting. FIG. 10 illustrates the updating of the remaining planes. In the situation when the value of the MMR was equal to "1111" on the first writing to the partial bytes, the second writing can be eliminated. The first writing set all planes to the appropriate values.

The system loads the MMR with the logical-NOT of itself, that is, it enabled all those planes not enable on the last update. The system then loads the computer CPU register with the logical-NOT of the previous input byte. The system executes the exchange instruction to exchange the contents of the computer CPU register and the target byte in the bitmap memory. FIG. 10 illustrates the new contents of the LRs, which is loaded from the target byte. Only plane1 has been updated.

Since the logical-NOT of the previous input byte was exchanged, the bit 5 through bit 7 of plane1 and plane2 are the logical-NOT of each other. This completes the setting of the pixels to the appropriate color.

Although the present invention has been described in terms of two preferred embodiments, it is not intended that the invention be limited to these embodiments. Modifications within the spirit of the invention will be apparent to those skilled in the art. The scope of the present invention is defined by the claims which follow.

We claim:

1. A method of updating a multiplane bitmap memory using a single plane bitmap as input, the single plane bitmap having values 1 and 0 to represent two preselected colors, color1 and color0, respectively, the multiplane bitmap memory using the corresponding bits in each plane to form a multibit value designating the color in accordance with a preselected set of multibit color designations, the bitmaps having a corresponding logical unit and corresponding latch register for each plane of the multiplane bitmap, the method comprising the steps of:

a. identifying the planes of the multiplane bitmap for which the preselected colors have common bit values;

b. setting all bits of the latch registers for each plane to the bit value of color0 for that plane;

c. for each byte of the single plane bitmap, logically exclusively ORing the value of the latch register with a value of 0 for each plane identified as having common bit values and with the byte of the single plane bitmap for the planes not identified as having common bit values to effect the update of the multiplane bitmap memory.

2. A method of updating a multiplane bitmap memory using a single plane bitmap as input, the single plane bitmap having values 1 and 0 to represent two preselected colors, color1 and color0, respectively, the multiplane bitmap memory using the corresponding bits in each plane to form a multibit value designating the color in accordance with a preselected set of multibit color designations, each plane of the multiplane bitmap having a corresponding logical unit and corresponding latch register, the method comprising the steps of:

a. identifying the planes of the multiplane bitmap for which the preselected colors have common bit values;

b. setting all bits of the latch register for each plane to the bit value of color1 for that plane; and c. for each byte of the single plane bitmap, complementing the logical exclusive-OR of the value of the latch register with a value of 1 for each plane identified as having common bit values and with the byte from the single plane bitmap for the planes not identified as having common bit values to effect the update of the multiplane bitmap memory.

3. A method of updating the memory of a graphics adapter to effect the display of a single plane bitmap using a single plane bitmap as input, the single plane bitmap having values 1 and 0 to represent two preselected colors, color1 and color0, respectively, the graphics adapter having multiple planes, an Enable Set/Reset Register (ESRR), and a Set/Reset Register (SRR), and a logical unit and a latch register for each plane, the method comprising the steps of:

identifying the planes of the graphics adapter memory for which the preselected colors have common bit values;

loading the ESRR with a value to select the input from the SRR for the identified planes and loading the ESRR with a value to select the input from the single plane bitmap for the planes not identified;

loading the SRR with a 0 for the identified planes so that the input to the logical unit for the identified planes is a 0;

writing into the memory of the graphics adapter a byte containing the color0;

loading the latch registers from the byte containing the color0;

setting the logical unit to perform the logical exclusive-OR function; and for each byte in the single plane bitmap, writing the byte to the memory of the graphics adapter to effect the update of the memory of the graphics adapter.

4. The method of claim 3 wherein the graphics adapter is compatible with the Enhanced Graphics Adapter.

5. The method of claim 3 wherein the graphics adapter is compatible with the IBM Video Graphics Array.

6. A method of updating all or a portion of a multiplane bitmap memory using a single plane bitmap as input, the portion to be updated including a plurality of bits within the bitmap which may comprise less than all bits within a byte of the bitmap, the single plane bitmap having values 1 and 0 to represent two preselected colors, color1 and color0, respectively, the multiplane bitmap memory using the corresponding bits in each plane to form a multibit value designating the color in accordance with a preselected set of multibit color designations, each plane having a corresponding latch register, the multiplane bitmap memory having an input byte, the multiplane bitmap memory having a memory mask register to selectively enable each plane and a bit mask register to select data to be written to each bit of the multiplane bitmap from between the latch register and the input byte, the method comprising the steps of:

a. identifying the planes of the multiplane bitmap for which the preselected colors have common bit values;

b. determining the planes of the multiplane bitmap for which the color1 has the value of 1;

c. setting the bit values of the memory mask register corresponding to the determined planes to a value to enable a write to the plane, setting the bit values of the memory mask register corresponding to the identified planes to a value to enable a write to the plane, and setting all other bit values of the memory mask register to a value to disable a write to the plane;

d. setting the bit mask register to select the input from the single plane bitmap for each bit in the portion of the multiplane bitmap to be updated and to select the input from the latch register for all other bits;

e. for each byte of the single plane bitmap, reading the current contents of the corresponding byte in the multiplane bitmap so as to load the latch registers with the values from the multiplane bitmap, and for each plane identified as having a common bit value, writing a byte having the common bit value in each bit that corresponds to the bits in the multiplane bitmap to be updated, and for all other planes, writing the byte of the single plane bitmap to the multiplane bitmap; and f. if not all bit values of the memory mask register were set to a value to enable a write to the plane in step c,
setting each bit value in the memory mask register to the logical complement of its setting; and
for each byte of the single plane bitmap, reading the current contents of the corresponding byte in the multiplane bitmap so as to load the latch registers, and for each plane identified as having a common bit value, writing a byte having the common bit value in each bit that corresponds to the bits in the multiplane bitmap to be updated, and for all other planes, writing the logical complement of the byte of the single plane bitmap to the multiplane bitmap for all other planes.

7. The method of claim 6 wherein the reading and writing of the multiplane bitmap memory in accomplished by using an exchange instruction.

8. A method of updating all or a portion of a multiplane bitmap memory using a single plane bitmap as input, the portion to be updated including a plurality of bits within the bitmap which may comprise less than all bits within a byte of the bitmap, the single plane bitmap having values 1 and 0 to represent two preselected colors, color1 and color0, respectively, the multiplane bitmap memory using the corresponding bits in each plane to form a multibit value designating the color in accordance with a preselected set of multibit color designations, each plane having a corresponding latch register, the multiplane bitmap memory having a data selector for each plane, the data selectors being one byte wide and having a 0-input, a 1-input, an enable input, and an output, the multiplane bitmap memory having a memory mask register to selectively enable each plane and a bit mask register to select data to be written to each bit of the multiplane bitmap memory from between the latch register and the output of the data selector, the data selectors having an associated Enable Set/Reset Register (ESRR) to selectively enable the value in the Set/Reset Register (SRR) and a value from the single plane bitmap onto the output of the data selectors, the method comprising the steps of:

a. loading the SRR with color0;
b. loading the ESRR with the logical-not of the logical exclusive-OR of color0 and color1;
c. loading the memory mask register with the logical-OR of the color1 and the value loaded in step b;
d. setting the bit mask register to select the input from the single plane bitmap for each bit in the portion of the multiplane bitmap to be updated and to select the input from the latch register for all other bits;
e. for each byte of the single plane bitmap, reading the current contents of the corresponding byte in the multiplane bitmap so as to load the latch registers with the values from the multiplane bitmap, and writing the byte of the single plane bitmap to the multiplane bitmap wherein the output of the data selector is determined by the settings of the SRR and the ESRR; and
f. if not all bit values of the memory mask register were set to a 1 in step c,
loading the memory mask register with the logical complement of value loaded into step b; and
for each byte of the single plane bitmap reading the current contents of the corresponding byte in the multiplane bitmap so as to load the latch registers and writing the byte of the single plane bitmap to the multiplane bitmap wherein the output of the data selector is determined by the settings of the SRR and the ESRR.

9. The method of claim 8 wherein the reading and writing of the multiplane bitmap memory is accomplished by using an exchange instruction.

10. The method of claim 8 wherein the multiplane bitmap memory resides in a graphics adapter.

11. The method of claim 8 wherein the graphics adapter is compatible with the Enhanced Graphics Adapter.

12. The method of claim 8 wherein the graphics adapter is compatible with the IBM Video Graphics Array.

13. An apparatus for updating a multiplane bitmap memory using a single plane bitmap as input, the single plane bitmap having values 1 and 0 to represent two preselected colors, color1 and color0, respectively, the multiplane bitmap memory using the corresponding bits in each plane to form a multibit value designating the color in accordance with a preselected set of multibit color designations, the bitmaps having a corresponding logical unit and corresponding latch register for each plane of the multiplane bitmap, the apparatus comprising:

a. means for identifying the planes of the multiplane bitmap for which the preselected colors have common bit values;
b. means for setting all bits of the latch registers for each plane to the bit value of color0 for that plane;
c. means for logically exclusively ORing the value of the latch register with a value of 0 for each plane identified as having common bit values and with a byte of the single plane bitmap for the planes not identified as having common bit values to effect the update of the multiplane bitmap memory.

14. An apparatus for updating a multiplane bitmap memory using a single plane bitmap as input, the single plane bitmap having values 1 and 0 to represent two preselected colors, color1 and color0, respectively, the multiplane bitmap memory using the corresponding bits in each plane to form a multibit value designating the color in accordance with a preselected set of multibit color designations, each plane of the multiplane bitmap having a corresponding logical unit and corresponding latch register, the apparatus comprising:

a. means for identifying the planes of the multiplane bitmap for which the preselected colors have common bit values;
b. means for setting all bits of the latch register for each plane to the bit value of color1 for that plane; and
c. means for complementing the logical exclusive-OR of the value of the latch register with a value of 1 for each plane identified as having common bit values and with a byte from the single plane bitmap for the planes not identified as having common bit values to effect the update of the multiplane bitmap memory.

15. An apparatus for updating the memory of a graphics adapter to effect the display of a single plane bitmap using a single plane bitmap as input, the single plane bitmap
having values 1 and 0 to represent two preselected colors,
color1 and color0, respectively, the graphics adapter having multiple planes, an Enable Set/Reset Register (ESRR), and a Set/Reset Register (SRR), and a logical unit and a latch register for each plane, the apparatus comprising:

means for identifying the planes of the graphics adapter memory for which the preselected colors have common bit values;

means for loading the ESRR with a value to select the input from the SRR for the identified planes and loading the ESRR with a value to select the input from the single plane bitmap for the planes not identified;

means for loading the SRR with a 0 for the identified planes so that the input to the logical unit for the identified planes is a 0;

means for writing into the memory of the graphics adapter a byte containing the color0;

means for loading the latch registers from the byte containing the color0;

means for setting the logical unit to perform the logical exclusive-OR function; and means for writing a byte to the memory of the graphics adapter to effect the update of the memory of the graphics adapter.

16. The apparatus of claim 15 wherein the graphics adapter is compatible with the Enhanced Graphics Adapter.

17. The apparatus of claim 15 wherein the graphics adapter is compatible with the IBM Video Graphics Array.

* * * * *

UNITED STATES PATENT AND TRADEMARK OFFICE
CERTIFICATE OF CORRECTION

PATENT NO. : 4,967,378

DATED : October 30, 1990

INVENTOR(S) : Wesley O. Rupel; Anthony C. Pisculli

It is certified that error appears in the above-identified patent and that said Letters Patent is hereby corrected as shown below:

In claim 7, column 9, line 17, please delete "in" and substitute therefor --is--.

Signed and Sealed this

Thirty-first Day of March, 1992

*Attest:*

HARRY F. MANBECK, JR.

*Attesting Officer*

*Commissioner of Patents and Trademarks*